Sept. 2, 1941.  J. H. BLANKENBUEHLER  2,254,882

WELDING SYSTEM

Filed Feb. 29, 1940

WITNESSES:
E. A. McCloskey.
G. V. Giolma

INVENTOR
John H. Blankenbuehler.
BY G. M. Crawford
ATTORNEY

Patented Sept. 2, 1941

2,254,882

UNITED STATES PATENT OFFICE 2,254,882

WELDING SYSTEM

John H. Blankenbuehler, Edgewood, Pa., assignor to Westinghouse Electric & Manufacturing Company, East Pittsburgh, Pa., a corporation of Pennsylvania Application February 29, 1940, Serial No. 321,491

9 Claims. (Cl. 219—8)

My invention relates, generally, to electric arc welding, and it has reference, in particular, to multiple circuit arc welding systems.

Generally stated, it is an object of my invention to provide, in a simple and effective manner, for connecting a plurality of arc welding circuits to a single source of welding current.

More specifically, it is an object of my invention to connect a plurality of welding circuits to a single source of welding current and provide for maintaining substantially constant circuit conditions in at least one of said circuits when another of said circuits is energized or de-energized.

Another object of my invention is to provide for automatically controlling the output conditions of a generator to maintain predetermined current conditions in any one of a plurality of welding circuits connected thereto when the load conditions in another of the welding circuits are altered.

Still another object of my invention is to provide for connecting a plurality of welding circuits to a generator and utilizing means responsive to changes in the load conditions of each welding circuit for compensating for the effect of said changes on another of the welding circuits so as to maintain predetermined conditions in said other welding circuit.

A further object of the invention is to provide for connecting a plurality of electric arc welding circuits to a source of welding current so that they are normally serially related, and also provide for maintain substantially constant conditions in any one of said welding circuits when another of the welding circuits is interrupted.

Other objects of the invention will, in part, appear obvious, and will, in part, be explained hereinafter.

In practicing my invention, an electric arc welding circuit may be connected to each of the terminals of a suitable source of welding current so as to be normally serially related. The work upon which the welding operations are to be performed may provide the external connection between the two welding circuits. Means responsive to the interruption of the welding circuits may be connected to each circuit so as to provide for completing the one circuit when the other of the welding circuits is deenergized. Suitable means may also be provided for compensating for the effect on the circuit conditions of the uninterrupted circuit of the deenergization of the other welding circuit, so as to maintain substantially constant circuit conditions in the uninterrupted welding circuit.

Figure 1:
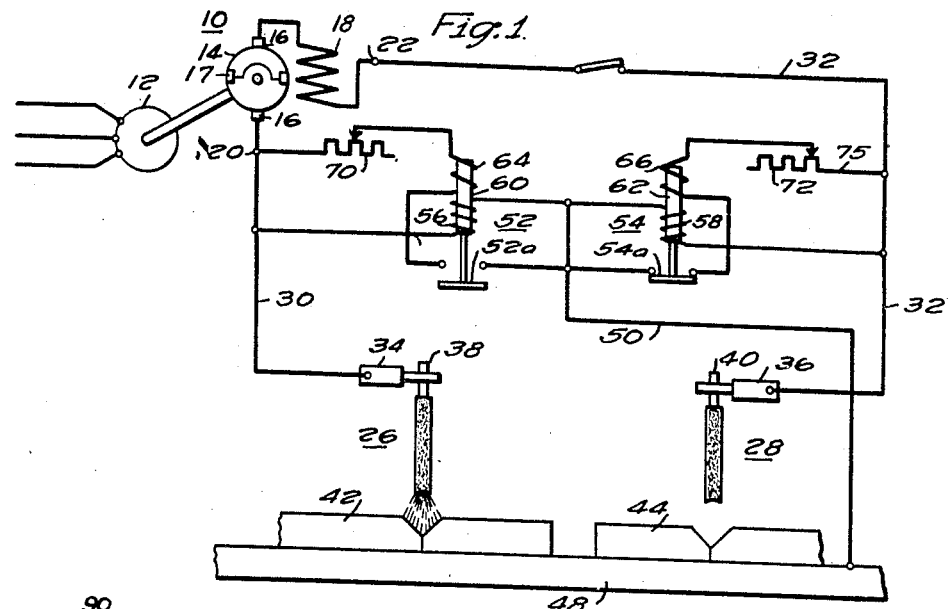

For a more complete understanding of the nature and scope of my invention, reference may be had to the following detailed description in connection with the accompanying drawing, in which Figure 1 is a diagrammatic view of a welding system embodying the principles of my invention.

Figure 2:
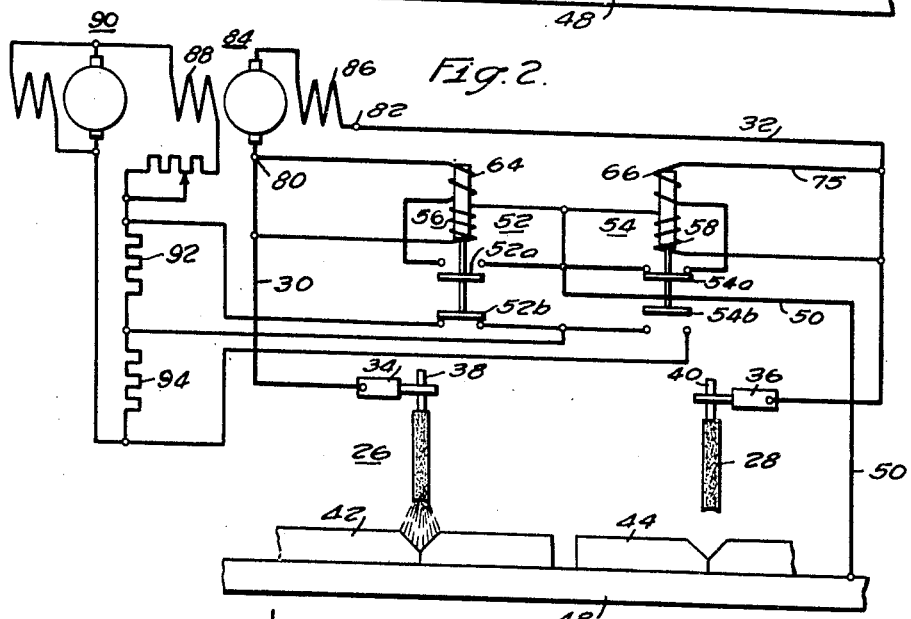
Figure 3:
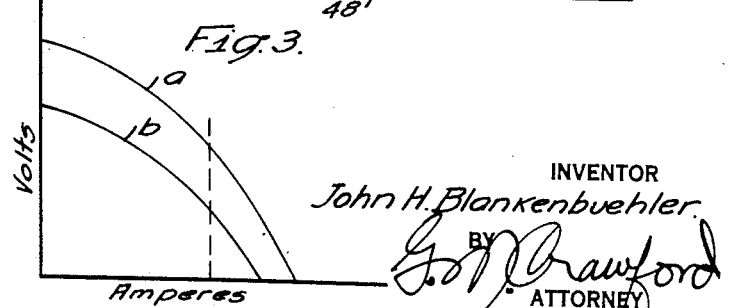

Fig. 2 is a diagrammatic view of a welding system embodying a modification of the invention, and Fig. 3 shows curves illustrating typical load characteristics of the generator in the welding system illustrated in Fig. 2.

Referring particularly to Fig. 1, the reference numeral 10 denotes generally a suitable source of welding current which may, for example, comprise a generator of the cross-field type, which is driven by a motor 12. The generator may be provided with an armature 14 having main brushes 16, and auxiliary close-circuited brushes 17, which are positioned in quadrature with respect to the main brushes. A series field winding 18 may be connected in series circuit relation with the main brushes 16 between the terminals 20 and 22 of the generator.

Suitable welding circuits 26 and 28, which may include conductors 30 and 32, electrode holders 34 and 36, welding electrodes 38 and 40, and workpieces 42 and 44, may be connected to the terminals 20 and 22 of the generator 10, respectively. The welding circuits may be completed in any suitable manner, the workpieces 42 and 44 being, for example, connected by being positioned on, or secured to, a common bed-plate 48, so that the circuits may be normally serially related to each other.

In order to provide for completing either of the welding circuits 26 and 28 when the other is interrupted, circuit means may be utilized for connecting either of the terminals 20 and 22 of the generator 10 or either of the welding circuits 26 and 28 to the bedplate 48 upon which the workpieces 42 and 44 are positioned, such as, for example, the conductor 50.

For the purpose of selectively connecting the conductor 50 to the terminals 20 and 22 of the generator or the welding circuits 26 and 28, electromagnetic relays 52 and 54 may be utilized. These relays may be provided with operating windings 56 and 58, which may be connected between the conductor 50 and the conductors 30 and 32, respectively, and which may be designed to actuate the armatures 60 and 62 of the relays only when the voltages of the welding circuits attain predetermined values greater than the normal arc voltages. In order to maintain the armatures 60 and 62 of the relays 52 and 54, respectively, in the operated position, they may be provided with auxiliary windings 64 and 66, which may, for example, be connected in series circuit relation with the conductor 50 and the terminals of the generator by the contact members 52a and 54a of the relays when they are in the operated position.

With a view to maintaining substantially predetermined circuit conditions in the uninterrupted welding circuit, when one of the welding circuits is interrupted, means may be provided for preventing any change in the terminal characteristics of the generator 10 when one of the welding circuits is interrupted. For example, auxiliary load devices, such as, for example, the adjustable resistors 70 and 72, disposed to be connected in series circuit relation between the conductor 50 and the welding circuits 26 and 28, or the terminals 20 and 22 of the generator, respectively, may be provided. The resistors 70 and 72 may be adjusted so as to simulate the load effects of their respective welding circuits on the generator.

In operation, when both of the welding circuits 26 and 28 are energized, the load circuit of the generator 10 will be completed from the terminal 20 through conductor 30, the electrode holder 34, electrode 38, workpiece 42, bedplate 48, workpiece 44, electrode 40, electrode holder 36, and conductor 32 back to the terminal 22 of the generator. Under these conditions, the relays 52 and 54 will be deenergized, since the voltages across the operating windings 56 and 58 thereof will be equal to the arc voltages of the welding circuits, which are insufficient to effect the operation of the relays.

Upon the interruption of either of the welding circuits, the relay connected thereto operates. As the circuits are similar in all respects, the operation may be explained by reference to the welding circuit 28. The voltage across the operating coil 58 of the relay 54 immediately increases upon the interruption of the circuit, so that the relay operates, closing contact members 54a and completing a circuit from the terminal 22 of the generator through the conductor 32, conductor 75, auxiliary load device 72, auxiliary holding winding 66, contact members 54a, and conductor 50 to the bedplate 48. A return circuit for the welding circuit 26 is thus provided and the auxiliary operating winding 66 is energized to maintain the relay 54 in the operated position, since the voltage across the operating winding 58 is reduced by the closure of the contact members 54a and the connection of the load device 72 to the terminal 22 of the generator.

By connecting the auxiliary load device 72 in series circuit relation with the terminal 22 of the generator, the output characteristics of the generator 10 may be maintained substantially constant, the auxiliary load device 72 being adjusted to simulate the load normally impressed on the generator by the welding circuit 28. In this manner, the load characteristics of the welding circuit 26 remain substantially unaltered, so that the welding operation thereof is not interfered with by the interruption of the welding circuit 28.

In a corresponding manner, when the welding circuit 28 is again completed, the current through the auxiliary holding winding 66 will be immediateely decreased to a value below that required to retain the armature 62 thereof in the operated position, since a shunt circuit is created about the operating winding 66 by the conductor 32, electrode holder 36, electrode 40, and workpiece 44. The relay 54, therefore, returns to the inoperative position, opening contact members 54a and interrupting the circuit through the auxiliary load device 72 and conductor 50. The welding circuits 26 and 28 will then be again connected in series circuit relation for simultaneous operation.

Referring to Fig. 2, the welding circuits 26 and 28 may, in this modification of the invention, be connected to the terminals 80 and 82, respectively, of a generator 84 of the usual type, having a series field winding 86, and a shunt or separately excited field winding 88. The field winding 88 may be connected to a suitable source of excitation such as the exciter 90.

In order to maintain substantially constant circuit conditions in one of the welding circuits when the other of the welding circuits is interrupted, the relays 52 and 54 may be connected in substantially the same manner shown in Fig. 1, for connecting the conductor 50 to the terminal of the generator to which the interrupted welding circuit is connected. Instead of maintaining the circuit conditions constant by utilizing an auxiliary load device in the manner shown in Fig. 1, suitable means may be provided for controlling the load characteristics of the generator by so varying the excitation of the field winding 88 as to reduce the output of the generator accordingly, when one of the welding circuits is interrupted.

For example, control means in the form of control resistors 92 and 94, which may be connected in series circuit relation with the field winding 88, and the exciter 90 may be provided. The normally closed contact members 52b and 54b of the relays 52 and 54, may, for example, be connected for normally bridging the control resistors so as to render them ineffective.

When both of the welding circuits 26 and 28 are deenergized, the voltages across the operating windings 56 and 58 of the relays 52 and 54, respectively, will be sufficiently high to effect the operation of the relays, thus opening the auxiliary contact meembers 52b and 54b, and closing the contact members 52a and 54a. Thus the control resistors 92 and 94 are both rendered effective, so that the excitation of the generator 84 is reduced and it runs at a reduced output, and the auxiliary windings 64 and 66 of the relays are energized to maintain the relays in the operated position.

When, for example, the electrode 38 is brought into contact with the workpiece 42, the current through the auxiliary holding winding 64 of the relay 52 is reduced to a value below that necessary to maintain the relay 52 in the operated position, because of the shunt circuit created by the welding circuit 26. The relay 52 returns to the inoperative position, opening contact members 52a to interrupt the connection between the conductor 50 and the terminal 80 of the generator. The auxiliary contact members 52b close, bridging the control resistor 92 and rendering it ineffective. The excitation of the field winding 88 of the generator 84 is thereby sufficiently increased to properly maintain an arc with the workpiece 42 for performing a welding operation thereon. The welding circuit may be traced from the terminal 80 of the generator 84, through conductor 30, the electrode holder 34, electrode 38, a workpiece 42, bedplate 48, conductor 50, contact members 54a, auxiliary holding winding 66, conductor 75 and conductor 32, back to the terminal 82 of the generator.

Should the electrode 40 be brought into engagement with the workpiece 44, the current through the auxiliary holding winding 66 of the relay 54 would be likewise reduced to a value below that required to maintain the relay 54 in the operated position. The relay 54, therefore, returns to the inoperative position, opening contact members 54a and closing the auxiliary contact members 54b so as to render the control resistor 94 ineffective. The excitation of the field winding 88 is thus further increased, to a value necessary to maintain both of the welding circuits.

Upon the interruption of either of the welding circuits, similar conditions result. For example, in the welding circuit 28, the voltage across the operating winding 58 of the relay 54 increases sufficiently to effect the operation of the relay. The contact members 54a close to complete the welding circuit 26 by connecting the conductor 50 to the terminal 82 of the generator. The contact members 54b open at the same time, thus inserting the control resistor 94 in the circuit of the field winding 88 of the generator. Thus the welding circuit 26 is maintained, and the output of the generator 84 is reduced sufficiently to maintain substantially predetermined circuit conditions in the uninterrupted welding circuit 26.

Referring to Fig. 3, the curves a and b represent typical output characteristics of the generator 84 under operating conditions when both welding circuits are energized, and when only one of the welding circuits is energized. It will be observed that when the generator is being operated with both welding circuits energized, the output characteristics may be such as are indicated by the curve a. If, for example, the generator output is represented by the values of current and voltage at the point where the vertical dotted line intersects the curve a, and either one of the welding circuits is interrupted, the control resistors 92 and 94 should be of such values that the output characteristics of the generator may then be so changed as to be represented by the values at the point where the vertical dotted line intersects the curve b. By properly selecting the values of the control resistors to thus control the output characteristics of the generator, the circuit characteristics of either welding circuit will be substantially unaffected by the energization or deenergization of the other of the welding circuits, since the voltage of the generator may be reduced to the value required for the one circuit, while the current remains substantially unaltered.

It will be apparent from the above description and the accompanying drawing that I have provided a simple and effective method of operating a plurality of welding circuits from a single source without harmful interference with either of the circuits from the energization or deenergization of the other. Since with existing forms of coated electrodes it is immaterial whether a welding circuit be "positive" or "negative," the apparent disadvantage of having the one welding circuit of reverse polarity with respect to the other is of no effect. By connecting the welding circuits in the manner indicated, two welders may operate from a single machine without requiring complicated and expensive control devices for regulating the characteristics of the welding circuits.

Since certain changes may be made in the above description, and different embodiments of the invention made without departing from the spirit thereof, it is intended that all the matters contained in the above description, or shown in the accompanying drawing, shall be considered as illustrative, and not in a limiting sense.

I claim as my invention:

1. The combination with a source of welding current, of a plurality of welding circuits connected in series circuit relation to the source, and a plurality of electromagnetic control devices having voltage windings connected to the said welding circuits for effecting operation of the devices upon the deenergization of their associated welding circuits and current windings effective upon operation of the devices to maintain them in the operated position during the deenergization of their associated welding circuits to maintain substantially constant load conditions in any of the welding circuits which remain energized.

2. In a multiple circuit welding system, the combination with a source having output terminals, of a welding circuit including a fusible electrode for performing a welding operation on work connected to each terminal, a common conductor connected to the work disposed to be connected to either of the terminals to complete the welding circuit connected to the other terminal, and electromagnetic switch means energized from each of the said welding circuits operable upon the deenergization of its associated welding circuit to connect the common conductor to the terminal to which said associated welding circuit is connected and maintain a substantially predetermined voltage across the other circuit.

3. The combination with a welding system including a generator, a welding circuit connected to each terminal of the generator in series circuit relation, and control means to control the current in the welding circuits, of a conductor connected between the welding circuits common to the said welding circuits for completing either of said welding circuits to work upon which a welding operation is to be performed, and electromagnetic means connected to each welding circuit responsive to the opening of its associated welding circuit operable to connect the said common conductor to provide for maintaining another of the welding circuits and render said control means effective to maintain substantially predetermined current conditions in said other welding circuit.

4. A multiple circuit welding system comprising, a source of welding current having output control means and a pair of output terminals, an electric arc welding circuit including a fusible electrode and work upon which a welding operation is to be performed connected to each of said output terminals, circuit means including a common conductor connected to the work for providing a return connection between either of the welding circuits and the other of the generator output terminals, a control circuit to render the output control means effective and electromagnetic means connected to each welding circuit responsive to the opening of its associated circuit operable to connect the common conductor to the generator output terminal with which said welding circuit is associated and complete the control circuit.

5. The combination with a generator having a pair of terminals, a field winding and field control means for varying the output of the generator, of a plurality of arc welding circuits connected to the generator terminals in series circuit relation including fusible electrodes for maintaining an arc with work upon which a welding operation is to be performed, a conductor connected to the work, control means connected to each of the welding circuits and the conductor responsive to opening or closing of the welding circuit to which it is connected to connect the conductor thereto or disconnect it therefrom, and circuit means connecting the control means and said field control means to effect a variation in the generator output so as to maintain substantially constant conditions in another of the welding circuits.

6. A multiple circuit welding system comprising, a source of welding current having output control means and at least a pair of terminals, a welding circuit including a fusible conductor and work upon which a welding operation is to be performed connected to each of said terminals, a conductor connected to the work disposed to be connected to either of the said terminals to complete the welding circuit connected to the other of said terminals, an auxiliary load for each welding circuit, and electromagnetic means connected to each welding circuit responsive to a predetermined increase in the voltage of said circuit to complete the other welding circuit through the auxiliary load and the said conductor.

7. The combination with a source of welding current having a pair of output terminals, of a welding circuit connected to each of said terminals, circuit means disposed to complete either of the welding circuits to the terminal other than that to which it is connected, a plurality of electromagnetic means each having an operating winding connected to one of the welding circuits to effect the operation of said means when the voltage of said welding circuit exceeds a predetermined value to connect the circuit means to said other terminal, and current responsive means effective upon the connection of the circuit means to said other terminal to maintain said connection.

8. A multiple circuit welding system comprising, a plurality of welding circuits connected in series circut relation to the terminals of a source, a plurality of auxiliary load devices, a common conductor, control means connected to each welding circuit responsive to the voltage of its associated welding circuit operable to connect one of the auxiliary load devices and the common conductor in series circuit relation with each other and in shunt circuit relation to the said associated welding circuit, and means responsive to the flow of current through the auxiliary load device to maintain the control means in the operated position.

9. The combination with a welding generator having output control means and output terminals, of a welding circuit connected to each of said terminals, circuit means disposed to ground either of the welding circuits, voltage responsive means connected to each welding circuit operative when the welding circuit is opened to connect the circuit means thereto, means actuated by the voltage responsive means to control the generator output control means to maintain substantially constant load conditions in another of the welding circuits which is closed, and means responsive to the connection of the circuit means to the said welding circuit to maintain said voltage responsive means in the operative position.

JOHN H. BLANKENBUEHLER.